United States Patent
Kishan et al.

(10) Patent No.: US 8,618,469 B2
(45) Date of Patent: Dec. 31, 2013

(54) OPTICAL TRAP

(75) Inventors: Dholakia Kishan, Fife (GB); Robert Marchington, Fife (GB); Ashok Praveen, Fife (GB)

(73) Assignee: University Court of the University of St Andrews, St Andrews (GB)

( * ) Notice: Subject to any disclaimer, the term of this patent is extended or adjusted under 35 U.S.C. 154(b) by 0 days.

(21) Appl. No.: 13/002,310

(22) PCT Filed: Jul. 17, 2009

(86) PCT No.: PCT/GB2009/001756
§ 371 (c)(1),
(2), (4) Date: Mar. 28, 2011

(87) PCT Pub. No.: WO2010/007371
PCT Pub. Date: Jan. 21, 2010

(65) Prior Publication Data
US 2011/0174961 A1    Jul. 21, 2011

(30) Foreign Application Priority Data

Jul. 17, 2008 (GB) .................................. 0813090.8

(51) Int. Cl.
*H05H 3/00* (2006.01)
*G02B 6/00* (2006.01)

(52) U.S. Cl.
USPC ........................................................ 250/251

(58) Field of Classification Search
USPC ........................................................ 250/251
See application file for complete search history.

(56) References Cited

U.S. PATENT DOCUMENTS

| | | | |
|---|---|---|---|
| 6,067,859 A | 5/2000 | Kas et al. | |
| 6,243,522 B1 | 6/2001 | Allan et al. | |
| 7,732,758 B2 * | 6/2010 | Dholakia et al. | 250/251 |
| 8,076,632 B2 * | 12/2011 | Kreysing et al. | 250/251 |
| 2002/0181113 A1 * | 12/2002 | Grier et al. | 359/614 |
| 2003/0044159 A1 * | 3/2003 | Anderson et al. | 385/142 |
| 2003/0183560 A1 | 10/2003 | Hannah | |
| 2007/0008528 A1 | 1/2007 | Chiou et al. | |
| 2009/0175586 A1 * | 7/2009 | Schmidt et al. | 385/132 |
| 2010/0014078 A1 * | 1/2010 | Dholakia et al. | 356/301 |
| 2010/0193673 A1 * | 8/2010 | Power et al. | 250/251 |

(Continued)

FOREIGN PATENT DOCUMENTS

| | | |
|---|---|---|
| WO | WO2007/141539 A1 | 12/2007 |
| WO | WO 2007141539 A1 * | 12/2007 |
| WO | WO 2008077630 A1 * | 7/2008 |

OTHER PUBLICATIONS

Gherardi, D. et al., "A dual beam photonic crystal fiber trap for microscopic particles" Applied Physics Letters 93, 041110 (2008).*

(Continued)

*Primary Examiner* — David A Vanore
*Assistant Examiner* — Wyatt Stoffa
(74) *Attorney, Agent, or Firm* — W. Kevin Ransom; Nicholas C. Russell; Moore & Van Allen, PLLC

(57) ABSTRACT

A system for forming an optical trap comprising two or more photonic crystal fibers (PCFs) and at least one source of radiation for inputting radiation to the photonic crystal fibers, the fibers being operable to provide counter-propagating outputs for forming the optical trap.

10 Claims, 8 Drawing Sheets

(56) References Cited

U.S. PATENT DOCUMENTS

2011/0089315 A1* 4/2011 Walt et al. .................. 250/251
2011/0091932 A1* 4/2011 Plewa et al. ................. 435/34
2011/0174961 A1* 7/2011 Kishan et al. ............... 250/251
2012/0196383 A1* 8/2012 Nitkowski et al. ........... 436/501
2012/0241643 A1* 9/2012 Palmer et al. ............... 250/428

OTHER PUBLICATIONS

Li, P. et al., "Manipulation and spectroscopy of a single particle by use of white-light optical tweezers" Optics Letters vol. 30, No. 2, 2005.*

Constable, A. et al., "Demonstration of a fiber-optical light-force trap"; Optics Letters, vol. 18, No. 21, Nov. 1, 1993; pp. 1867-1869.

Russell, Phillip S., "Photonic-Crystal Fibers"; Journal of Lightwave Technology, vol. 24, No. 12, Dec. 2006; pp. 4729-4749.

Cizmar, Tomas et al., "Optical conveyor belt for delivery of submicron objects"; Applied Physics Letters, vol. 86, Apr. 21, 2005; pp. 174101-1-17401-3

Li, Peng et al., "Manipulation and spectroscopy of a single particle by use of white-light optical tweezers"; Optical Letters, vol. 30, No. 2, Jan. 15, 2005; pp. 156-158.

Russell, Phillip S., "Photonic Crystal Fibers"; Science, vol. 299, Jan. 2003; pp. 358-362.

Dabirian, Ali et al., "The radiated fields of the fundamental mode of photonic crystal fibers"; Optics Express, vol. 13, No. 11, May 30, 2005; pp. 3999-4004.

Cizmar, Tomas et al., "Optical sorting and detection of submicrometer objects in a motional standing wave"; Physical Review, vol. 74, 200; pp. 035105-1-035105-6, 2006.

Zemanek, Pavel et al., "Simplified description of optical forces acting on a nanoparticle in the Gaussian standing wave"; Journal of the Optical Society of America, vol. 19, No. 5, May 5, 2002; pp. 1025-1034.

Duffy, David. C. et al., "Rapid Prototyping of Microfluidic Systems in Poly(dimethylsiloxane)"; Analytical Chemistry, vol. 70, No. 23, Dec. 1, 1998; pp. 4974-4984.

International Search Report for PCT/GB2009/001756 dated Feb. 18, 2010.

UK Search Report for GB0813090.8 dated Nov. 11, 2008.

* cited by examiner

OPTICAL TRAP

FIELD OF THE INVENTION

The present invention relates to a long-range dual beam counter-propagating optical trap that may support multiple wavelengths simultaneously.

BACKGROUND OF THE INVENTION

Optical micromanipulation using optical trapping is a powerful and versatile tool for studies in colloidal and biological science. An optical trap can be formed using two counter propagating diverging beams due to a combination of optical refraction and optical scattering, as described, for example, in the article "Demonstration of a Fibre-Optical Light-Force Trap" by Constable et al., Opt. Lett. 18, 1867 (1993). The trap described by Constable et al uses two optical fibers fibres that deliver light to a trap region in a counter-propagating geometry. This dual beam trap may be easily integrated into micro-fluidic devices, has a large capture range, does not use tightly focused light, and allows trapping and imaging to be decoupled.

In the last decade, photonic crystal fibers (PCF) have become available. Photonic-crystal fibers are based on the properties of photonic crystals. These are able to confine light in hollow cores or with confinement characteristics not possible in conventional optical fiber. Categories of PCF include photonic bandgap fibers that confine light by band gap effects, holey fibers, which use air holes in their cross-sections, hole-assisted fibers, which guide light by a conventional higher-index core modified by the presence of air holes, and Bragg fibers that are formed by concentric rings of multilayer film. PCFs are normally uniform along their length, but include from two or more materials, most commonly arranged periodically over much of the fiber cross-section, as shown in FIG. 1.

PCFs can be engineered to have vastly different properties compared to conventional silica fibers, see for example P. Russell, Science 299, 358 (2003). With the appropriate design of the crystal lattice, fibers can be designed so that large core sizes (much larger than standard single mode fibers) may confine any wavelength of light in a single mode. These fibers are known as endlessly single mode photonic crystal fibers (ESM-PCF) or large mode area photonic crystal fibers (LMA-PCF).

SUMMARY OF THE INVENTION

According to the present invention, there is provided a system for forming an optical trap, the system comprising two or more photonic crystal fibers and at least one source of radiation for inputting radiation to the photonic crystal fibers, the fibers fibres being arranged in use to provide counter-propagating outputs for forming the optical trap. The fibers may be ESM-PCFs.

The at least one source may provide multiple wavelengths for inputting to the PCFs. Separate sources may be provided for each wavelength. The multiple wavelengths may each form an optical trap. Light of each wavelength may be used to provide a standing wave trap that is sensitive to a particular particle size and/or shape and/or refractive index. Means may be provided for moving the standing waves so that particles within the trap are moved along in a conveyer belt type manner.

The radiation for forming the dual beam may comprise white light. An advantage of this is that multiple particles of different types can be trapped simultaneously, without suffering from interference effects. Also, different wavelengths may be launched simultaneously allowing for trapping, for example, with spectroscopy.

Means may be provided for performing one or more measurements on a particle when it is in the trap. The means may include one or more beams of light that are passed along at least one of the fibers fibres. The light may be used for fluourescence or raman spectroscopy.

According to another aspect of the invention, there is provided a method for sealing an end of a PCF comprising inserting the end of the PCF in a fluid that is drawn into holes in the PCF and hardening the fluid that is drawn into the holes in the PCF.

The fluid may be a heat sensitive material, e.g. an elastomer, for example a silicone elastomer. Heating of the fluid may be used to cause hardening.

The fluid may be a photosensitive material, such as a photosensitive epoxy. The photosensitive material may be sensitive to UV light. Exposing the fluid to light may cause hardening.

According to another aspect of the invention, there is provided a method for incorporating optical fibers into molded microfluidic chips by attaching sections of the fiber onto a chip master mold.

BRIEF DESCRIPTION OF THE DRAWINGS

Various aspects of the invention will now be described by way of example only with reference to the accompanying drawings, of which.

DETAILED DESCRIPTION OF THE DRAWINGS

The present invention uses PCFs in various optical systems to create optical traps and generate trapping based optical transport mechanisms. Using PCFs in these applications provides unexpected technical advantages.

Figure 1:
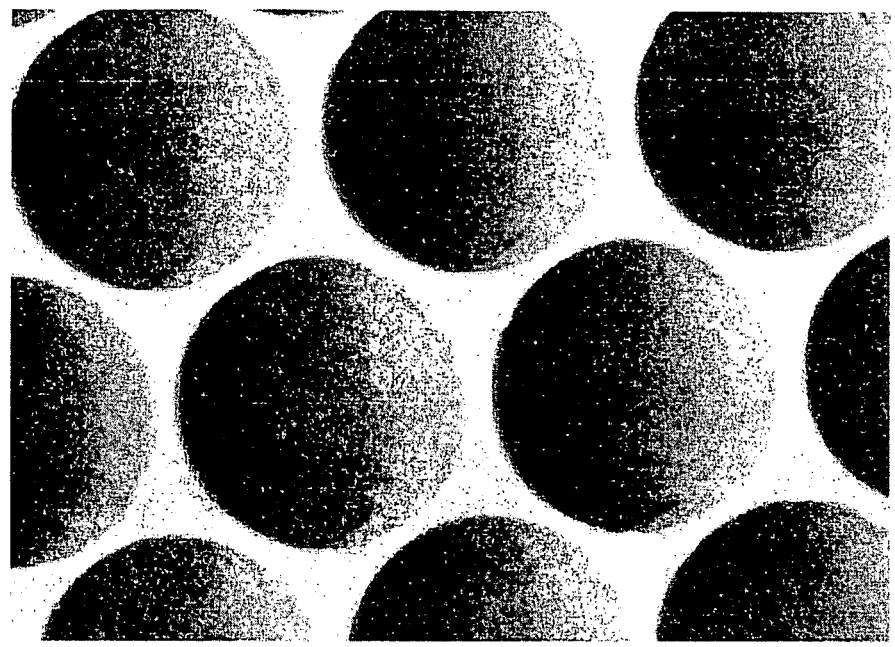
FIG. 1 is an example of the cross-section of a PCF.
Figure 1:
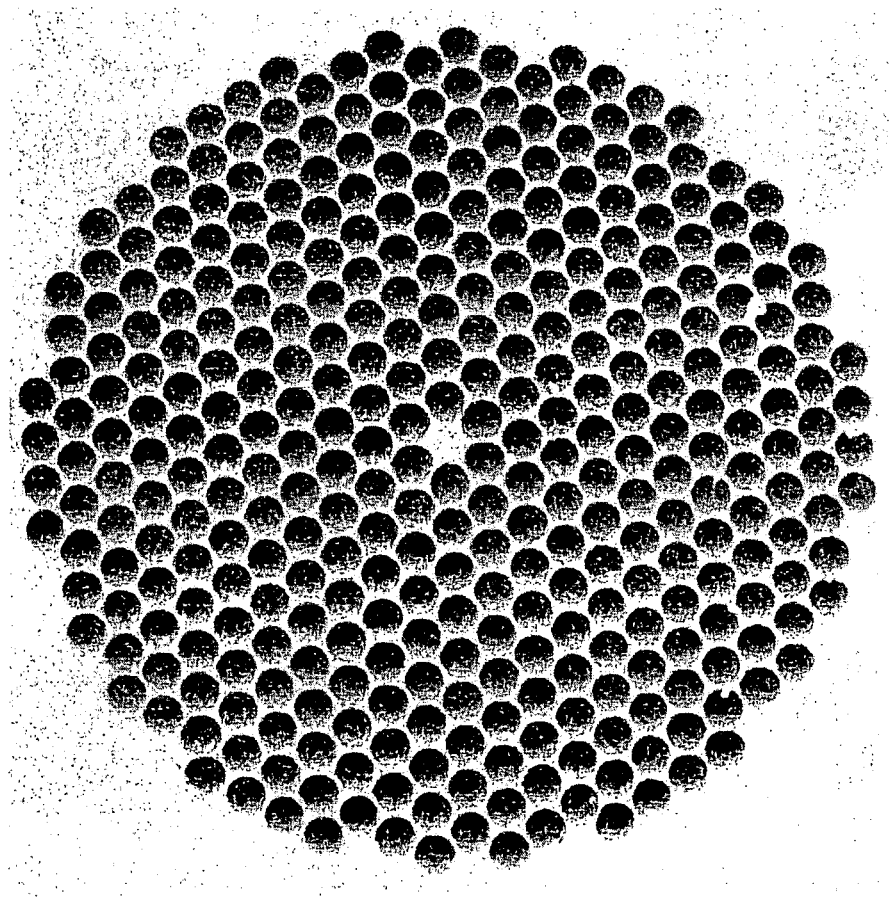
Figure 2:
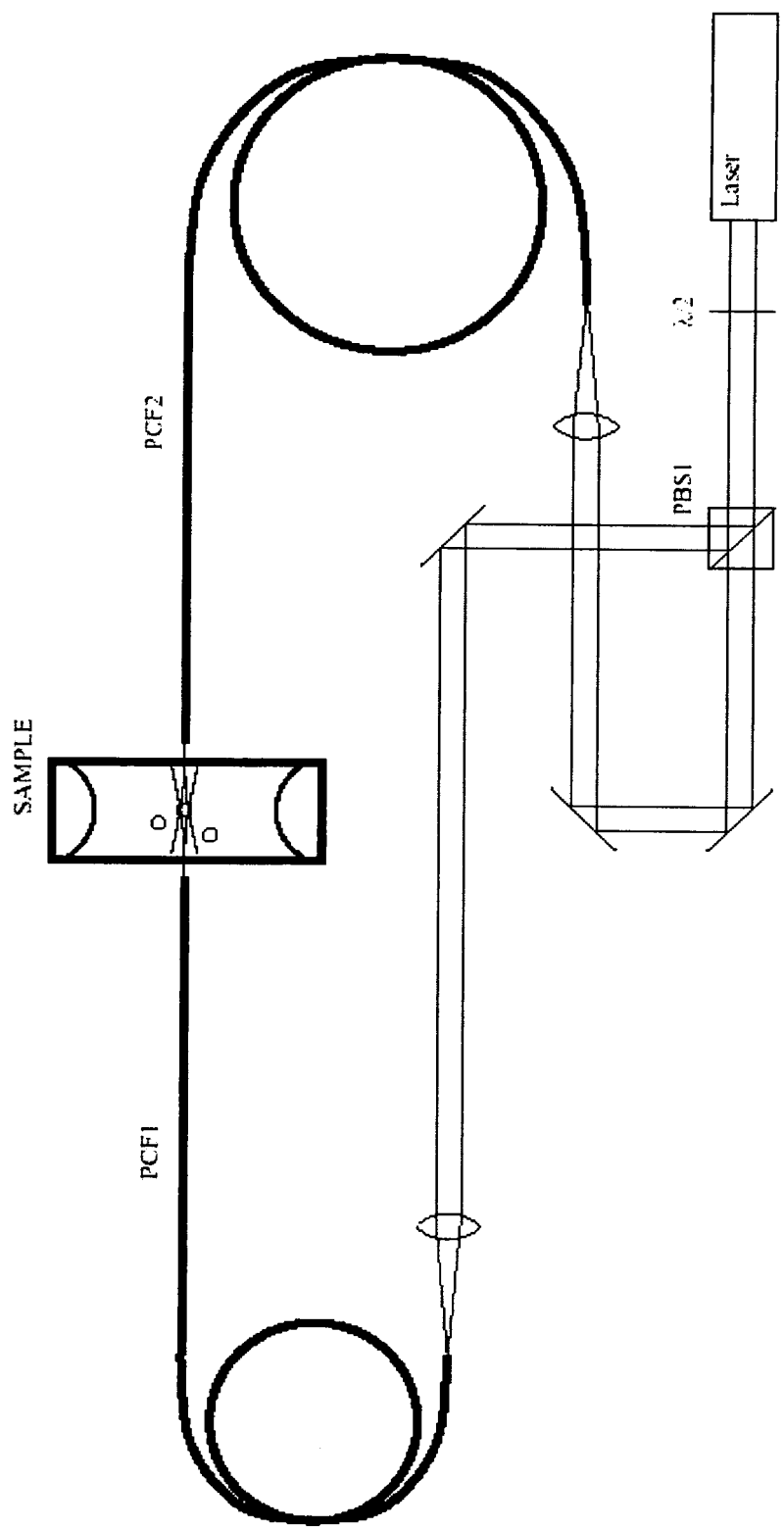
FIG. 2 is system for forming a dual beam trap using PCFs.

FIG. 2 shows a system for forming a dual beam trap. This has a single coherent laser that has the same mode field diameter as the fundamental mode of the fibers. Each fiber is coupled to the ends of two PCFs using an appropriate lens to match the focused spot size to the full loop to ensure single mode operation and linear polarization output. The lengths of the fibers are selected so that there is sufficient path length difference to ensure that the two outputs do not interfere with each other and so can be considered mutually incoherent. Between the fibers is a sample chamber for containing the sample under investigation. The counter propagating outputs from the PCFs are used to form an optical trap within the sample chamber. A fast camera (not shown) combined with a data analysis is used to determine trap positions and trap stiffness.

Figure 3:
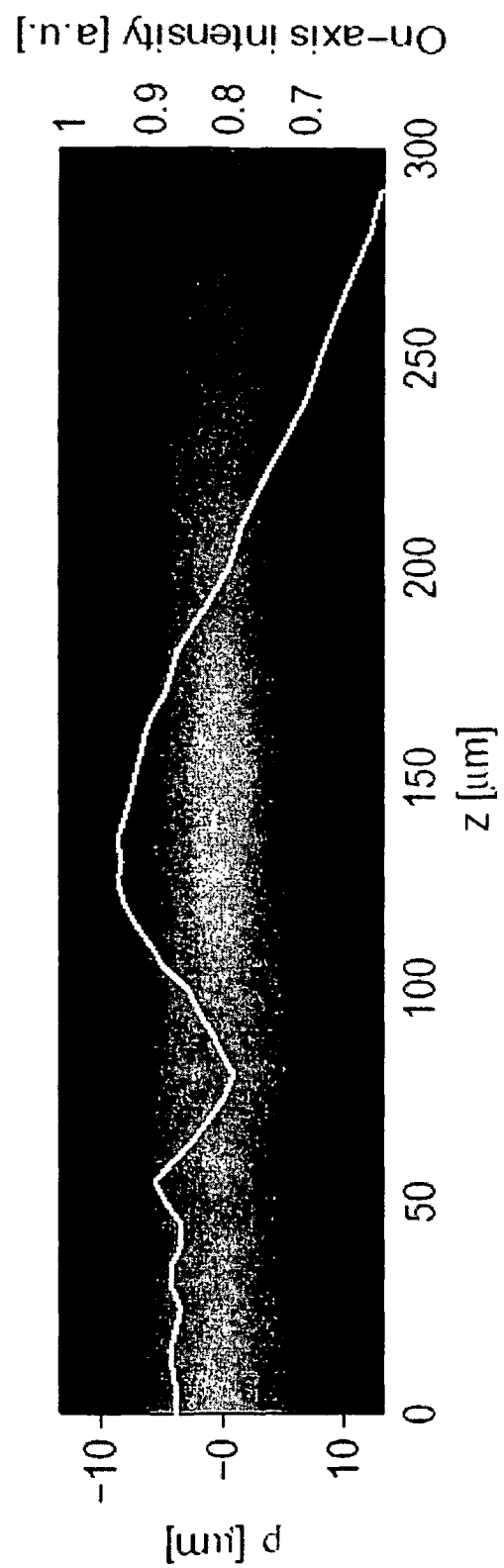
FIG. 3 shows a) the intensity profile and b) the on-axis intensity profile for a PCF as a function of the propagation distance z past the end of the fiber.

FIG. 3 shows a) the intensity profile, and b) the on-axis intensity profile for a PCF. In both cases, the profile is shown as a function of the propagation distance z past the end of the fiber. Due to this characteristic on-axis intensity profile it is possible, by adjusting the separation of the fibers, to change the axial optical potential to form a conventional trapping potential, repulsive potential (where the particles are repelled away from the trap center) and line traps (with minimal restoring forces along the axial direction). The characteristics of the light needed to form these types of dual beam trap are known in the art and so will not be described in detail.

Any suitable PCF fiber could be used in the system of FIG. 2, although preferably the fibers are ESM-PCFs. In one example, the fibers used were 25.2+−0.4 µm core ESM-PCF supplied by Crystal Fibre (product code LMA-25). The mode field diameter (MFD) and numerical aperture (NA) at 1070 nm of these fibers are quoted as 19.9+−2 µm and 0.04+−0.01 respectively. In contrast to a typical single mode fiber for near infrared, the LMA-25 has a considerably larger MFD and lower beam divergence. The PCFs have a hexagonal shaped output mode and consequently the mode output does not propagate with a Gaussian dependency. As the mode propagates in free space the on-axis intensity comes to a focus. This 'focal length' increases as the core diameter of the fiber is increased and as the wavelength decreases, see Dabirian, M. Akbari, and N. A. Mortensen, Optics Express 13, 3999 (2005). For the LMA-25 fiber the observed focal length is 130 µm for 1064 nm light.

Figure 4:
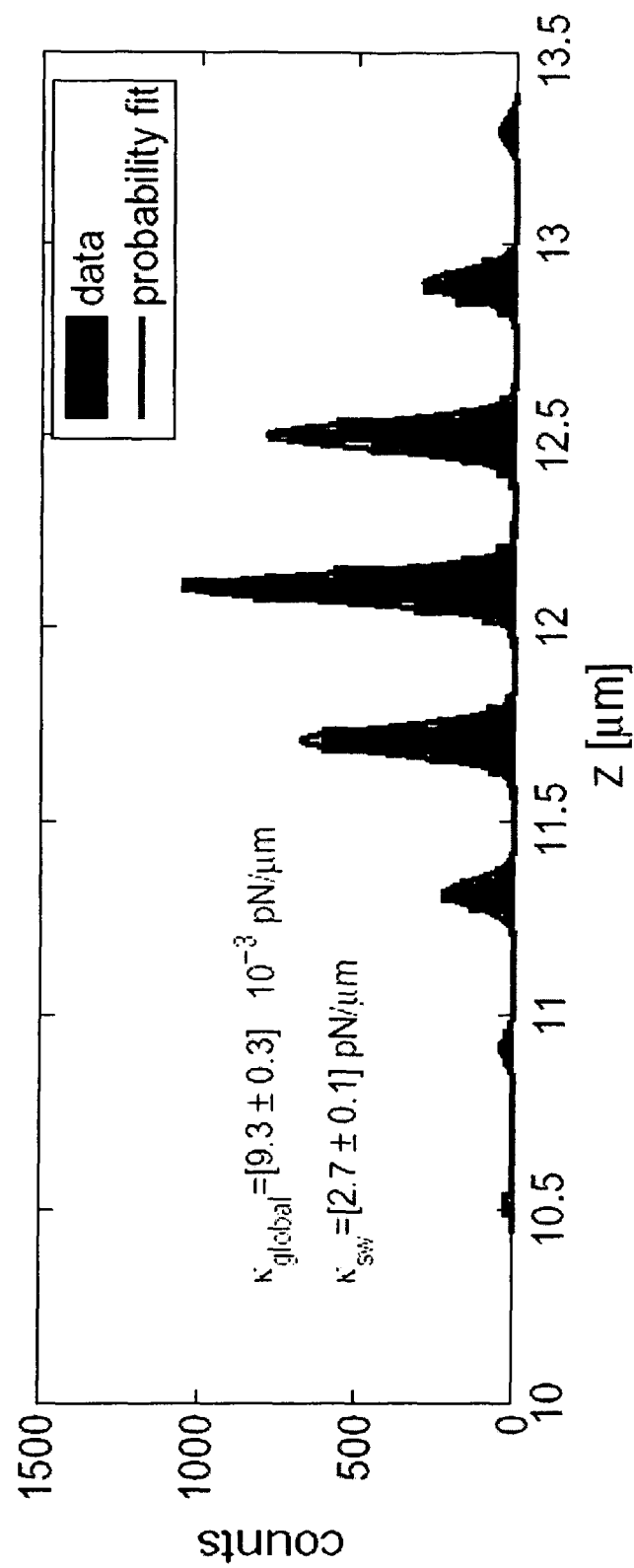
FIG. 4 is histogram of particle positions in a dual beam PCF trap formed using a coherent laser source.

In a first study, a near infrared laser with a coherence length of about 2 mm was used and the sample consisted of dielectric particles of sizes varying from 0.5 µm to 5 µm dispersed in water within a sample capillary. Particles of this size could be readily trapped. Although in this study the laser beams forming the trap were mutually incoherent, standing wave effects were observed in the trap due to the interference of each individual beam with its reflection from the capillary walls. Since there are two standing wave components, one from each beam, their influence on particle trapping can be suppressed or intensified by controlling the relative phases between the standing waves, which varies with the distance of the trapping site from the capillary walls. FIG. 4 demonstrates this particle behavior in a form of histogram of trapping positions. From this, it can be seen that the standing-wave trap stiffness is about two orders of magnitude higher in comparison to that for a standard fiber trap (9.3+−0.3−10−3 pN/µm at power of 300 mW).

Figure 5:
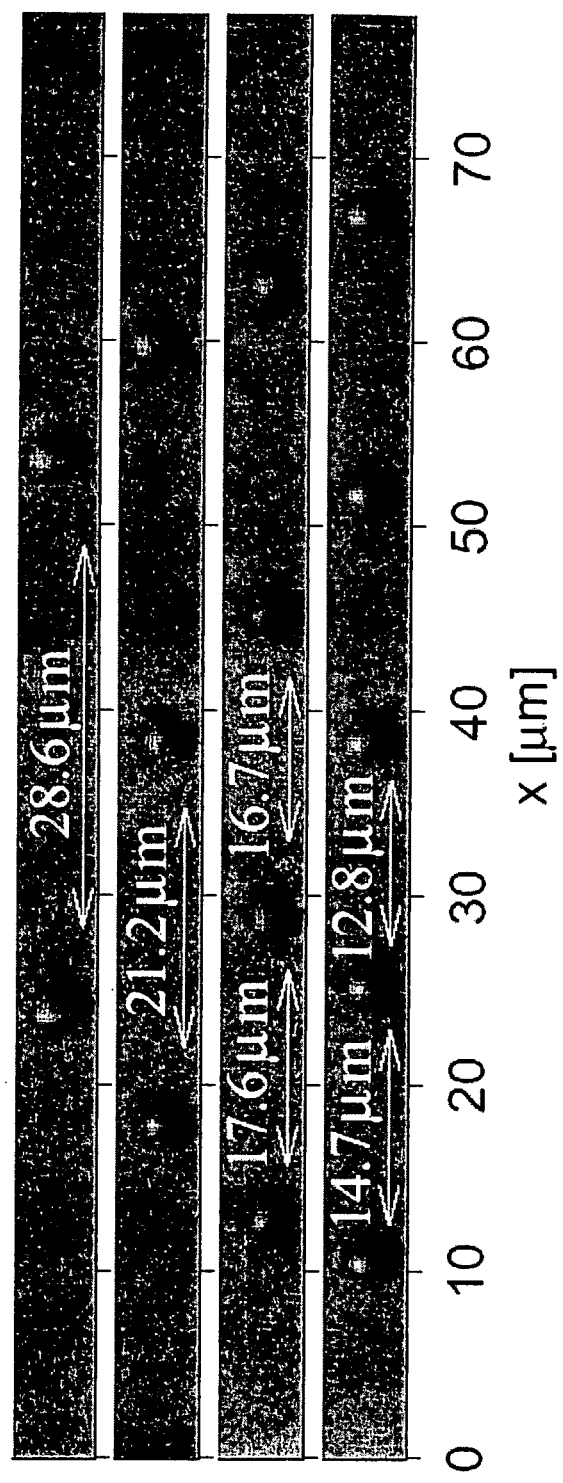
FIG. 5 is an image of optically bound particles in a PCF-fiber dual beam low coherence white light trap.
Figure 6:
FIG. 6 is an image of an optically trapped cell in a PCF-fiber dual beam low coherence white light trap.

As well as single wavelength trapping, the dual beam arrangement of FIG. 2 can be used to form white light trap. To demonstrate this, the monochromatic light source of FIG. 2 was replaced with a white light source, and in particular a 5 W supercontinuum light source (Fianum Model SC-500-6). The spectrum of the supercontinuum after the output alters slightly to the input, as the fibers have different bend losses for different wavelengths. The output power of the fiber was around 115 mW in each arm. The transmission efficiency of the fibers was around 50% for the broadband supercontinuum radiation and at the output of the fibers a 600 nm-900 nm spectrum that peaks at 720 nm was obtained. The coherence length was calculated to be less than 1 µm, which is short enough to obviate any interference effects from the walls and between the particles. This arrangement was used to create a single dual beam white light trap, as shown in FIG. 5. This low coherence light trap permits long range longitudinal optical binding of microparticles in the trap with no deleterious interference effects. Indeed, in experiments, an ideal restoring potential was observed.

Within the white light trap shown in FIG. 5 multiple particles are trapped in groups or chains. The particles position themselves depending on both the trapping potential and inter-particle binding potentials. Chains with larger numbers of particles are closely packed and separations on the interior of the chain are smaller than on exterior of the chain. In this instance, however, inter-particle interference phenomena caused by back scattering of light by the confined bound particles is avoided and consequent modulation of the optical forces due to the interference of back-scattered light with the original beam. In the case of a coherent source, interference results in multistability in the inter-particle separations with a period of the standing wave. Since the coherence length of the supercontinuum source is less than the inter-particle separation, this influence can be suppressed. In order to demonstrate this, the separation of two particles was analyzed, and no evidence of such multistability was seen.

Using a white light source, a low coherence dual beam trap can be created that obviates issues related to interference from fiber facets, capillary walls or multi-particle interactions. This permits novel studies of long range longitudinal optical binding in a substantially interference free potential.

Counter propagating monochromatic fields can create standing wave traps that can be spatially translated to realize a conveyor belt, as described by T. Cizmar et al, Phys. Rev. B 74, 035105 (2006) and Zemanek et al. Opt. Soc. Am. A19, 1025 (2002). In particular, altering the phase difference between the counter propagating interfering beams can provide movement of the standing-wave maxima and minima together with the trapped objects. The particle can be confined in a maximum or minimum in the intensity of the standing wave, depending upon the particle parameters, e.g. size and or/refractive index. For appropriate parameters the particle can be made sensitive or insensitive to the presence of the standing wave structure. By using a PCF, this known form of optical conveyer belt can be extended to provide a dual wavelength optical conveyor belt that is able to transport different particles using different wavelengths.

Figure 7:
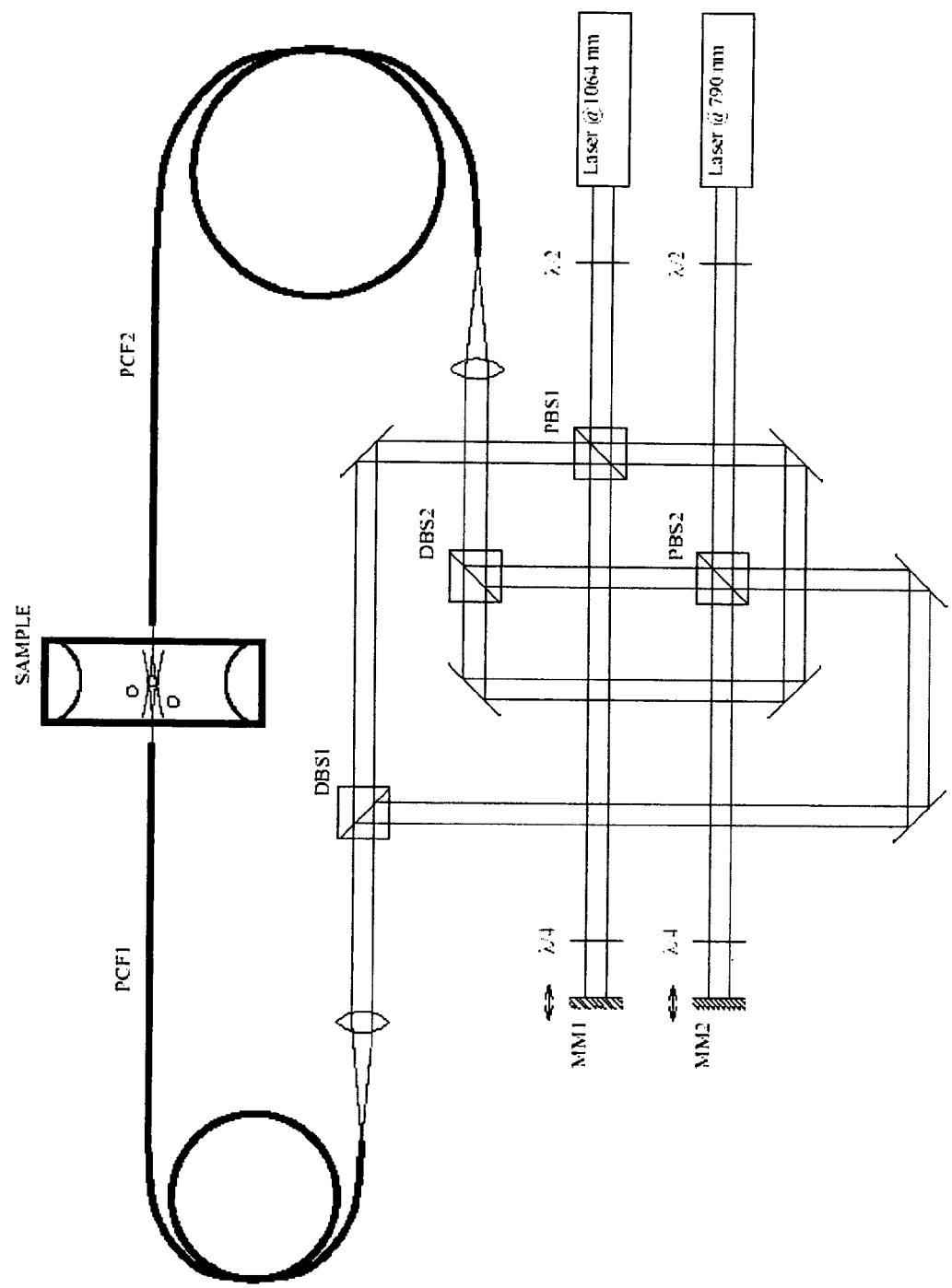
FIG. 7 is a system for generating a multi wavelength optical conveyer belt for trapping, transporting and sorting particles.

FIG. 7 shows a system for providing a dual wavelength optical conveyor belt using PCFs. This has two highly coherent laser sources operating at different frequencies, in this case 780 nm and 1064 nm respectively. The outputs of these lasers are combined and coupled to one end of each of two PCFs using an appropriate lens. Each fiber is placed in a full loop to ensure single mode operation and linear polarization output and the fiber lengths are selected so that the outputs do not interfere. Between the fibers is a sample chamber for containing the sample under investigation. The counter propagating outputs from the PCFs are used to form two standing wave optical traps within the sample chamber, one for particles sensitive to the first laser source, in this example the 780 nm laser, and the second for particles sensitive to the second laser, i.e. the 1064 nm laser. A fast camera (not shown) combined with a data analysis is used to determine trap positions and trap stiffness.

Using PCFs to form the dual beam trap allows multiple light sources to be used, which brings higher selectivity for sorting and positioning of individual particles of varying size and/or shape and/or refractive index.

To test the system of FIG. 7, a sample having two sizes of polystyrene particle, in this case 500 nm and 600 nm, was selected. The 500 nm diameter particles are sensitive to the standing wave at 780 nm whilst being insensitive to the standing wave at 1064 nm, and vice versa for the 600 nm diameter particles. Using a mixture of these two particle sizes, selective positioning of particles in a dual color conveyor belt is possible, as shown in FIG. 8.

Figure 8:
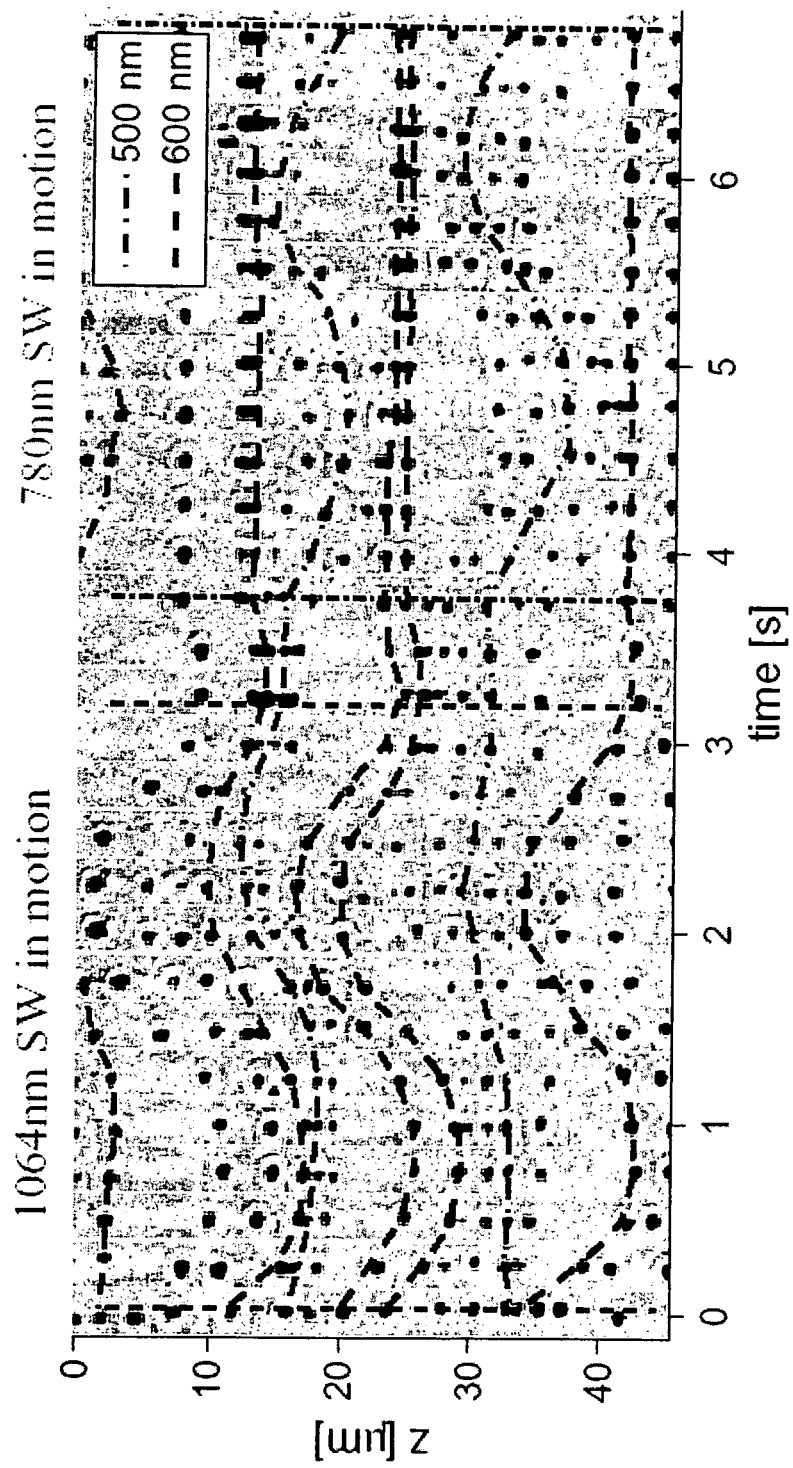
FIG. 8 is an image of particles moving in a multi wavelength optical conveyer belt generated using the system of FIG. 7.

FIG. 8 shows the tracks for particles in the counter propagating monochromatic fields as they are spatially translated to realize a conveyor belt. The left hand side of FIG. 8 shows the particle tracks when the standing wave formed by the 1064 nm laser is moved and the right hand side shows the particle tracks when the standing wave formed by the 780 nm laser is moved. From this it can be seen that while the 1064 nm standing wave was moving but the 780 nm wave was stationary, the 500 nm diameter particles, that are nominally insensitive to the 1064 nm standing wave showed some movement. However, this was found to be the result of binding effects with the 600 nm particles, due to the high concentration of particles in the sample under test, and not sensitivity to 1064 nm standing wave.

Using two (or more) single-frequency lasers and PCFs, controllable and selective transport of particles can be provided in an enhanced multicolor conveyor belt that might be efficiently used as a sorting device for microparticles.

PCFs provide excellent opportunities for sensing applications wherein an optical signal from a biological or chemical fluid is to be collected. The PCF can be used to deliver and/or collect the light as required for the specific sensing application. However, a problem with using PCF is that is has many tiny holes within its structure. Upon insertion into a fluid, the fluid is drawn into the holes due to capillary effects. This destroys the wave-guiding effect required for collection or delivery of light. Currently, this is addressed by attaching a solid end cap to the fiber or applying pressure to close the holes in a short section at the end of the fiber. However, this is difficult to do in practice and requires specialist equipment.

In accordance with another aspect of the invention, there is provided a simple and effective technique for forming an end cap on a PCF. The method involves positioning an end of the fiber in a fluid, for example a biocompatible silicon elastomer, which can be drawn into the holes in the fiber and subsequently hardened, thereby to form an end cap. The material can be cured to harden it. Any suitable material could be used provided it has a viscosity that such that it can be drawn into the fiber holes and can be hardened by, for example, heating. As an example, photosensitive materials could be used, such as photosensitive epoxies, e.g. SU-8 or Norland optical adhesive.

This method can be carried out using very basic equipment, such as a beaker to hold the fluid and a hot plate for heating and thereby hardening the fluid once it is drawn into the fiber end.

To provide a microfluidic counter-propagating fiber trap-on-chip, the PCFs can be incorporated into a microfluidic chip containing fluid channels. The technique applies where a molding technique is used to form the microfluidic chip, such as in soft lithography as reviewed in D. C. Duffy et al. Analytical Chemistry 70, 4974 (1998). A master mold is formed containing relief structures for the fluid channels, as well as the optical fibers required for beam delivery or collection. Sections of optical fiber are positioned and attached to the mold by means of a thin adhesion layer, such as SU-8 epoxy or Norland optical adhesive. Microfluidic chips are then cast from the master mold, which are an inverted copy of the mold, i.e. the fiber on the mold produces a channel of fibre-sized dimensions in the chip and the relief structures produce fluid channels. Optical fiber can then be inserted into the fiber sized channel of the actual chip for beam delivery. By incorporating the fibers into the mold, alignment of the fibers is conducted when the mold is fabricated, so that all chips cast from the mold have pre-aligned optical fiber channels. Careful positioning of fibers with respect to other fibers, fluid channels or other components on the chip can thus be obtained.

To form the optical arrangement for forming a dual beam trap in accordance with the invention a single piece of PCF fiber can be attached to the mold, before defining a fluid channel across the PCF, perpendicularly and bisecting it. After molding the chip from this master mold, fibers can be inserted into both of the two ends of the fiber channel such that the cleaved (and optionally capped) ends of the fiber align with the edge of the fluid channel wall, as such forming a counter-propagating trap setup within the chip.

A skilled person will appreciate that variations of the disclosed arrangements are possible without departing from the invention. For example, because PCFs can support multiple wavelengths, they provide a very simple and effective means for trapping particles or cells with light of a particular wavelength and performing spectroscopy, for example raman or fluorescence spectroscopy, or some other optical measurement with light of a different wavelength. As an example, a particle could be held using a first color or indeed the white-light trap described above and another color could be launched into one or both of the PCFs to perform the spectroscopy. The excited signal can be collected along one of the fibers or using a suitably positioned optical collection arrangement, such as a microscope objective. Accordingly the above description of the specific embodiment is made by way of example only and not for the purposes of limitation. It will be clear to the skilled person that minor modifications may be made without significant changes to the operation described.

The invention claimed is:

1. A system for forming an optical trap comprising two or more photonic crystal fibers (PCFs) and at least one source of radiation for inputting radiation to the photonic crystal fibers, the fibers being operable to provide counter-propagating outputs of radiation for forming the optical trap, wherein the radiation for forming the optical trap comprises white light.

2. A system as claimed in claim 1 wherein the fibers are endlessly single mode photonic crystal fibers (ESM-PCFs).

3. A system as claimed in claim 1 comprising at least one source for providing multiple wavelengths for inputting to the PCFs.

4. A system as claimed in claim 3 wherein discrete wavelengths of light are used, each to form a separate optical trap.

5. A system as claimed in claim 1 wherein the arrangement is such that the PCFs operate in a single mode.

6. A system as claimed in claim 1 wherein the arrangement is such that the output of the PCFs is linearly polarized.

7. A system as claimed in claim 1 comprising means for performing one or more measurements on a particle when it is in the trap.

8. A system for forming an optical trap comprising two or more photonic crystal fibers (PCFs) and at least one source of radiation for inputting radiation to the photonic crystal fibers, the fibers being operable to provide counter-propagating outputs for forming the optical trap, wherein the radiation source is a broadband supercontinuum source.

9. A system for forming an optical trap comprising two or more photonic crystal fibers (PCFs) and at least one source of radiation for inputting radiation to the photonic crystal fibers, the fibers being operable to provide counter-propagating outputs for forming the optical trap, the system further comprising at least one source for providing multiple wavelengths for inputting to the PCFs, wherein discrete wavelengths of light are used, each to form a separate optical trap and the light of at least one of the wavelengths is arranged to form a standing wave trap that is sensitive to a particular particle size and/or shape and/or refractive index.

10. A system as claimed in claim 9 wherein means are provided for moving the at least one standing wave so that particles within the trap formed by that standing wave are moved.

* * * * *